United States Patent
Kumeta et al.

(10) Patent No.: US 11,193,032 B2
(45) Date of Patent: *Dec. 7, 2021

(54) AQUEOUS INK JET INK COMPOSITION AND INK JET PRINTING METHOD

(71) Applicant: Seiko Epson Corporation, Tokyo (JP)

(72) Inventors: Hiroaki Kumeta, Matsumoto (JP); Soichi Yamazaki, Shiojiri (JP); Shunsuke Uchizono, Shiojiri (JP); Manabu Taniguchi, Shiojiri (JP)

(73) Assignee: Seiko Epson Corporation

( * ) Notice: Subject to any disclaimer, the term of this patent is extended or adjusted under 35 U.S.C. 154(b) by 0 days.

This patent is subject to a terminal disclaimer.

(21) Appl. No.: 16/853,810

(22) Filed: Apr. 21, 2020

(65) Prior Publication Data
US 2020/0332139 A1  Oct. 22, 2020

(30) Foreign Application Priority Data

Apr. 22, 2019 (JP) .............................. JP2019-080825

(51) Int. Cl.
| C09D 11/322 | (2014.01) |
| B41M 5/00 | (2006.01) |
| C09D 11/033 | (2014.01) |
| C09D 11/037 | (2014.01) |
| B41J 2/21 | (2006.01) |
| B41J 2/01 | (2006.01) |

(52) U.S. Cl.
CPC .............. C09D 11/322 (2013.01); B41J 2/01 (2013.01); B41J 2/2107 (2013.01); B41M 5/0023 (2013.01); C09D 11/033 (2013.01); C09D 11/037 (2013.01)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237

See application file for complete search history.

(56) References Cited

U.S. PATENT DOCUMENTS

| 5,925,178 A | 7/1999 | Martin et al. |
| 5,972,087 A | 10/1999 | Uraki et al. |
| 6,039,796 A | 3/2000 | Kubota et al. |
| 8,404,761 B2 | 3/2013 | Shinozaki et al. |
| 8,460,450 B2 | 6/2013 | Taverizatshy et al. |
| 9,221,253 B2 | 12/2015 | Suzuki et al. |
| 2004/0127619 A1* | 7/2004 | Sun ...................... C09D 11/322 524/385 |
| 2013/0050355 A1* | 2/2013 | Imamura ................ B41J 2/2107 347/84 |
| 2013/0224451 A1 | 8/2013 | Shiono et al. |
| 2016/0102218 A1* | 4/2016 | Liu .......................... C09D 11/38 347/100 |
| 2018/0079921 A1* | 3/2018 | Okamoto ................. B41M 5/00 |
| 2018/0273787 A1* | 9/2018 | Herlihy ................ B41M 5/0023 |
| 2018/0273788 A1* | 9/2018 | Ito .......................... C09D 11/38 |
| 2018/0291220 A1* | 10/2018 | Ito ........................ C09D 11/037 |
| 2018/0346745 A1* | 12/2018 | Ito ........................ C09D 11/107 |
| 2019/0040272 A1* | 2/2019 | Ito ........................ C09D 11/322 |

FOREIGN PATENT DOCUMENTS

| EP | 2327746 B1 | 2/2013 |
| JP | H10-060342 A | 3/1998 |
| JP | H11-012516 A | 1/1999 |
| JP | 2000-053901 A | 2/2000 |
| JP | 2002-206063 A | 7/2002 |
| JP | 2008-201840 A | 9/2008 |
| JP | 2010-510357 A | 4/2010 |
| JP | 2010-174100 A | 8/2010 |
| JP | 2011-057916 A | 3/2011 |
| JP | 2011-111527 A | 6/2011 |
| JP | 2013-181055 A | 9/2013 |
| JP | 2015-110291 A | 6/2015 |

* cited by examiner

*Primary Examiner* — Manish S Shah
(74) *Attorney, Agent, or Firm* — Harness, Dickey & Pierce, P.L.C.

(57) ABSTRACT

An ink composition contains pigment particles, inorganic oxide particles, and a lactam solvent. The content of the inorganic oxide particles is 5.0% to 10.0% relative to the total mass of the ink composition. The ink composition satisfies the following relationship:

$D_{50}$ of the pigment particles$\times 0.1 \leq D_{50}$ of the inorganic oxide particles$\leq D_{50}$ of the pigment particles$\times 1.5$, wherein $D_{50}$ represents the volume median diameter of the corresponding particles.

5 Claims, No Drawings

AQUEOUS INK JET INK COMPOSITION AND INK JET PRINTING METHOD

The present application is based on, and claims priority from JP Application Serial Number 2019-080825, filed Apr. 22, 2019, the disclosure of which is hereby incorporated by reference herein in its entirety.

BACKGROUND

1. Technical Field

The present disclosure relates to an aqueous ink jet ink composition and an ink jet printing method.

2. Related Art

An ink jet printing method is a technique of printing performed by ejecting small ink droplets onto a printing medium, such as a paper sheet, from an ink jet head. The ink jet printing method is being innovatively developed and is accordingly being used for high-resolution image printing, which has been performed in the fields of photo printing and offset printing. For example, JP-T-2010-510357 discloses an ink composition containing silica fine particles.

One approach to improving the image quality of printed items is to increase the color developability of ink compositions. An increase in the color developability of an ink composition may minimize the environmental impact from the ink composition. More specifically, an ink composition having a high color developability can provide a high optical density for the printed item even if the application amount of the ink composition is small, consequently resulting in a reduced amount of the ink composition used. It has been found that an ink composition containing a pigment and inorganic oxide particles whose particle sizes have a specific relationship has a high color developability. Although the ink composition disclosed in JP-T-2010-510357 contains silica particles, the ink composition is intended to form a dry film on a printed circuit board, and there is no statement about improving color developability. Hence, this cited ink composition has an issue in terms of improving color developability.

The present inventors found through their study that ink compositions containing inorganic oxide particles are likely to solidify in nozzles, thus causing ejection failure. Also, it was found that in order to recover smooth ejection of the ink composition through the nozzles, the nozzles must be subjected to cleaning many times.

It was also found that the use of inorganic oxide particles having a small diameter increases the wet friction of the resulting printed item. Printed items having an increased wet friction are unlikely to be neatly or smoothly stacked one on the print side of another.

SUMMARY

The present inventors conducted intensive research to solve the above issues and found that the following ink composition exhibits satisfactory recovery from clogging and provides a low wet friction, while achieving high color development. The ink composition contains pigment particles, inorganic oxide particles with a content in a specific range, and a lactam solvent, and in which the volume median diameters $D_{50}$'s of the pigment particles and the inorganic oxide particles satisfy the following specific relationship.

Accordingly, the present disclosure provides an aqueous ink jet ink composition containing pigment particles, inorganic oxide particles, and a lactam solvent. The content of the inorganic oxide particles is 5.0% to 10.0% relative to the total mass of the ink composition. The ink composition satisfies the following relationship:

$$D_{50} \text{ of the pigment particles} \times 0.1 \leq D_{50} \text{ of the inorganic oxide particles} \leq D_{50} \text{ of the pigment particles} \times 1.5$$

wherein $D_{50}$ represents the volume median diameter of the corresponding particles.

The present disclosure is also directed to an ink jet printing method including an ink application step of applying the above-described ink composition onto a printing medium by ejecting the ink composition from an ink jet head. In the ink application step, the ink composition may be ejected at an amount of 3.6 mg/inch$^2$ or more.

The $D_{50}$ of the inorganic oxide particles may be 11 nm to 100 nm. The inorganic oxide particles may be silica particles. The lactam solvent may be 2-pyrrolidone or ε-caprolactam.

DESCRIPTION OF EXEMPLARY EMBODIMENTS

Some embodiments of the subject matter of the present disclosure will now be described. However, the implementation of the subject matter is not limited to the disclosed embodiments, and various modifications may be made without departing from the scope and spirit of the present disclosure.

Aqueous Ink Jet Ink Composition

The aqueous ink jet ink composition (hereinafter simply referred to as the ink composition) disclosed herein contains pigment particles, inorganic oxide particles, and a lactam solvent. The ink composition satisfies the following relationship (1):

$$D_{50} \text{ of the pigment particles} \times 0.1 \leq D_{50} \text{ of the inorganic oxide particles } D_{50} \text{ of the pigment particles} \times 1.5 \quad (1)$$

wherein $D_{50}$ represents the volume median diameter of the corresponding particles.

Also, in the ink composition disclosed herein, the content of the inorganic oxide particles is 5.0% to 10.0% relative to the total mass of the ink composition.

Such an ink composition enables satisfactory recovery from clogging and can provide a low wet friction for the printed item while achieving high color development.

The term "aqueous ink jet ink composition" used herein refers to an ink composition containing 30% or more of water relative to the total mass of the ink composition. The term "lactam solvent" mentioned herein refers to a compound that is liquid at 25° C. and having a cyclic amide structure.

Relationship (1)

The constituent particles in the ink composition satisfy the following relationship (1):

$$D_{50} \text{ of the pigment particles} \times 0.1 \leq D_{50} \text{ of the inorganic oxide particles} \leq D_{50} \text{ of the pigment particles} \times 1.5 \quad (1)$$

wherein $D_{50}$ represents the volume median diameter of the corresponding particles.

The ink composition satisfying relationship (1) can exhibit high color developability and provide a low wet friction for the printed item. Probably, the inorganic oxide particles in the ink composition applied onto a printing medium act to retain the pigment particles on the surface of the printing medium. Consequently, the ink composition produces high color development. In addition, the present inventors found that when the pigment particles and the inorganic oxide particles have $D_{50}$'s satisfying the above-presented relationship (1), the ink composition can exhibit high color developability and provide a low wet friction for the printed item.

In some embodiments, the ink composition may satisfy the following relationship (1L-1), beneficially relationship (1L-2), to increase the color developability.

$D_{50}$ of the pigment particles×0.2≤$D_{50}$ of the inorganic oxide particles (1L-1)

$D_{50}$ of the pigment particles×0.3≤$D_{50}$ of the inorganic oxide particles (1L-2)

In some embodiments, the ink composition may satisfy the following relationship (1H-1), beneficially relationship (1H-2) or (1H-3), to further increase the color developability.

$D_{50}$ of the inorganic oxide particles≤$D_{50}$ of the pigment particles×1.2 (1H-1)

$D_{50}$ of the inorganic oxide particles≤$D_{50}$ of the pigment particles×1.0 (1H-2)

$D_{50}$ of the inorganic oxide particles≤$D_{50}$ of the pigment particles×0.8 (1H-3)

The term volume median diameter, represented by $D_{50}$, used herein is the value at 50% by volume in a cumulative particle size distribution measured by a dynamic light scattering method. For example, the $D_{50}$ of a material can be determined by measuring the material diluted to 200 times with pure water with a Zeta-potential & Particle Size Analyzer ELSZ-1000ZS (manufactured by Otsuka Electronics).

Inorganic Oxide Particles

The content of the inorganic oxide particles is 5.0% to 10.0% relative to the total mass of the ink composition. When the content of the inorganic oxide particles is in this range, the ink composition enables satisfactory recovery from clogging and can provide a low wet friction for the printed item while achieving high color development.

In some embodiments, the content of the inorganic oxide particles in the ink composition may be 5.5% or more, for example, 6.0% or more, relative to the total mass of the ink composition. The ink composition containing inorganic oxide particles with such a content exhibits a high color developability and provides a low wet friction for the printed item. Also, the content of the inorganic oxide particles may be 9.0% or less, for example, 8.5% or less or 8.0% or less, relative to the total mass of the ink composition. Such an ink composition enables satisfactory recovery from clogging.

Examples of the inorganic oxide particles include, but are not limited to, particles of silica, alumina, titania, zirconia, antimony oxide, tin oxide, tantalum oxide, zinc oxide, cerium oxide, lead oxide, and indium oxide. The inorganic oxide particles may be particles of a single oxide or of two or more of these oxides. In some embodiments, silica particles or alumina particles may be used, and silica particles may be more beneficial.

An inorganic oxide sol, such as, but not limited to, silica sol, may be added as the inorganic oxide particles into the ink composition. Silica sol is commercially available, and examples thereof include, but are not limited to, SI-550, SI-30P, SI-45P, and SI-80P (all produced by JGC Catalysts & Chemicals); and ST-30L and MP-1040 (both produced by Nissan Chemical Industries).

The $D_{50}$ of the inorganic oxide particles may be 11 nm to 100 nm. In some embodiments, the $D_{50}$ of the inorganic oxide particles may be 15 nm or more, for example, 20 nm or more or 30 nm or more. Also, the $D_{50}$ of the inorganic oxide particles may be 100 nm or less, for example, 90 nm or less or 80 nm or less. The ink composition containing such inorganic oxide particles can exhibit a higher color developability.

Pigment Particles

A pigment particle is a particle containing a pigment. The pigment may be chromatic, black, or white or have a fluorescent color. Also, the Pigment may be inorganic or organic. Examples of the pigment used in the ink composition disclosed herein are as follows:

Carbon black may be used in a black ink, and examples thereof include, but are not limited to, No. 2300, No. 900, MCF88, No. 33, No. 40, No. 45, No. 52, MA7, MA8, MA100, and No. 2200B (all produced by Mitsubishi Chemical); Raven series 5750, 5250, 5000, 3500, 1255, and 700 (all produced by Columbia Carbon); Regal series 400R, 330R, and 660R (all produced by Cabot); Mogul L (produced by Cabot); Monarch series 700, 800, 880, 900, 1000, 1100, 1300, and 1400 (all produced by Cabot); Color Black series FW1, FW2, FW2V, FW18, FW200, S150, S160, and S170 (all produced by Degussa); Printex series 35, U, V, and 140U (all produced by Degussa); and Special Black series 6, 5, 4A, and 4 (all produced by Degussa).

Examples of the pigments used in a white ink include, but are not limited to, C.I. Pigment Whites 6, 18, and 21, titanium oxide, zinc oxide, zinc sulfide, antimony oxide, zirconium oxide, and white hollow resin particles, and polymer particles.

Examples of the pigment used in a yellow ink include, but are not limited to, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in a magenta ink include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violets 19, 23, 32, 33, 36, 38, 43, and 50.

Examples of the pigment used in a cyan ink include, but are not limited to, C.I. Pigment Blues 1, 2, 3, 15, 15:1, 15:2, 15:3, 15:34, 15:4, 16, 18, 22, 25, 60, 65, and 66; and C.I. Vat Blues 4 and 60.

Other pigments may be used, and examples thereof include, but are not limited to, C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

The pigment used in the ink composition may be self-dispersible. Self-dispersible pigments have a hydrophilic group. The hydrophilic group may be, but is not limited to, —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, or —NR$_3$. M's in some of the above-cited groups each independently represent a hydrogen atom, an alkali metal, ammonium, a substituted or unsubstituted phenyl group, or an organic ammonium, and R's each independently represent an alkyl group having a carbon number of 1 to 12 or a substituted or unsubstituted naphthyl group.

The self-dispersible pigment is produced by, for example, binding any of the above-cited hydrophilic groups to a pigment. For binding the hydrophilic group to a pigment, the pigment may be subjected to, for example, vacuum plasma treatment, ozone oxidation, phosphoric acid treatment, or wet oxidation with an oxidizing agent in water, or p-aminobenzoic acid may be bound to the surfaces of the pigment particles to bind the carboxy group to the surfaces with the phenyl group therebetween. The technique for binding is not limited to these techniques. In some embodiments, carbon black treated by ozone oxidation or phosphorylation may be used as the pigment, and carbon black subjected to ozone oxidation may be beneficially used.

Some self-dispersible pigments are commercially available, and examples thereof include Aqua-Black 162 (produced by Tokai Carbon), Microjet CW-1 (produced by Orient Chemical Industries), and CAB-O-JET (registered trademark) series 200, 300, and 450C (all produced by CABOT). Such pigments may be used singly or individually as the pigment particles.

The $D_{50}$ of the pigment particles may be 10 nm to 300 nm. The ink composition containing such pigment particles exhibits a higher color developability, provides a low wet friction for the printed items, and enables satisfactory recovery from clogging. In some embodiments, the $D_{50}$ of the pigment particles may be 24 nm or more, for example, 40 nm or more or 65 nm or more. Also, the $D_{50}$ of the Pigment particles may be 200 nm or less, for example, 150 nm or less or 110 nm or less.

The content of the pigment particles may be 1.0% to 20.0% relative to the total mass of the ink composition. Such an ink composition exhibits a higher color developability, provides a low wet friction for the printed item, and enables satisfactory recovery from clogging. In some embodiments, the content of the pigment particles in the ink composition may be 3.0% or more, for example, 5.0% or more, relative to the total mass of the ink composition. Also, the content of the pigment particles may be 15.0% or less, for example, 10.0% or less, relative to the total mass of the ink composition.

Lactam Solvent

The ink composition contains a lactam solvent. The lactam solvent in the ink composition acts to increase the color developability of the ink composition, reduce the wet friction of the printed item, and helps recovery from clogging.

Examples of the lactam solvent include, but are not limited to, N-methyl-2-pyrrolidone, N-hydroxyethyl-2-pyrrolidone, 2-pyrrolidone, and ε-caprolactam. Such lactam solvents may be used individually or in combination. In some embodiments, 2-pyrrolidone or ε-caprolactam may be used from the viewpoint of improving recovery from clogging.

The lactam solvent content may be 1.0% to 20.0% relative to the total mass of the ink composition. Such an ink composition enables more satisfactory recovery from clogging. In some embodiments, the lactam solvent content in the ink composition may be 2.5% or more, for example, 3.0% or more, relative to the total mass of the ink composition. Also, the lactam solvent content may be 15.0% or less, for example, 10.0% or less, relative to the total mass of the ink composition.

Further Organic Solvent

In an embodiment, the ink composition may contain an organic solvent other than the lactam solvent (hereinafter referred to as a further organic solvent). Examples of such a further organic solvent include, but are not limited to, polar aprotic solvents other than lactam solvents, monoalcohols, alkyl polyols, and glycol ethers.

Examples of polar aprotic solvents other than lactam solvents include, but are not limited to, γ-butyrolactone, 1,3-dimethyl-2-imidazolidinone, dimethyl sulfoxide, imidazole, 1-methylimidazole, 2-methylimidazole, and 1,2-dimethylimidazole.

Exemplary monoalcohols include, but are not limited to, methanol, ethanol, n-propyl alcohol, isopropyl alcohol, n-butyl alcohol, 2-butanol, tert-butyl alcohol, isobutyl alcohol, and n-pentyl alcohol, 2-pentanol, 3-pentanol, and tert-pentyl alcohol.

Exemplary alkyl polyols include, but are not limited to, glycerin, ethylene glycol, diethylene glycol, triethylene glycol, propylene glycol (1,2-propanediol), dipropylene glycol, 1,3-propylene glycol (1,3-propanediol), isobutylene glycol (2-methyl-1,2-propanediol), 1,2-butanediiol, 1,3-butanediol, 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, 1,8-octanediol, and trimethylolpropane.

Exemplary glycol ethers include, but are not limited to, diethylene glycol mono-n-propyl ether, ethylene glycol monoisopropyl ether, diethylene glycol monoisopropyl ether, ethylene glycol mono-n-butyl ether, ethylene glycol mono-tert-butyl ether, diethylene glycol mono-n-butyl ether, triethylene glycol mono-n-butyl ether, diethylene glycol mono-tert-butyl ether, propylene glycol monomethyl ether, propylene glycol monoethyl ether, propylene glycol mono-tert-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, and dipropylene glycol monoisopropyl ether. The further organic solvents cited above may be used individually or in combination.

The content of the further organic solvent, if added, may be 1.0% to 70.0% relative to the total mass of the ink composition. In some embodiments, the further organic solvent content may be 5.0% by mass or more, for example, 10.0% by mass or more. Also, the further organic solvent content may be 50.0% by mass or less, for example, 30.0% by mass or less.

Water

The ink composition disclosed herein contains water. The water may be, but is not limited to, pure water or ultra-pure water in which ionic impurities are minimized. Examples of such water include ion-exchanged water, ultrafiltered water, reverse osmosis water, and distilled water. Sterile water prepared by, for example, UV irradiation or addition of hydrogen peroxide may be used. The use of sterile water can prevent the occurrence of mold or bacteria in the ink composition during storage for a long period. Thus, the ink composition can be stably stored.

The water content may be 10.0% to 90.0% relative to the total mass of the ink composition. In some embodiments, the water content may be 40.0% by mass or more, for example, 50.0% by mass or more. Also, the water content may be 80.0% by mass or less, for example, 70.0% by mass or less.

Surfactant

In some embodiments, the ink composition disclosed herein may contain a surfactant from the viewpoint of consistent ejection in an ink jet printing method and appropriate permeation of the ink composition. The surfactant may be, but is not limited to, an acetylene glycol-based surfactant, a fluorosurfactant, or a silicone surfactant.

Examples of the acetylene glycol-based surfactant include, but are not limited to, 2,4,7,9-tetramethyl-5-decyne-4,7-diol and alkylene oxide adducts thereof, and 2,4-dimethyl-5-decyne-4-ol and alkylene oxide adducts thereof. Such surfactants may be used individually or in combination.

The acetylene glycol-based surfactant is commercially available, and examples thereof include, but are not limited to, Olfine 104 and Olfine E1010 (both produced by Nissin Chemical Industry), and Surfynol series 104, 465, 61, and DF110D (all produced by Evonik Industries).

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxide compounds. Such surfactants may be used individually or in combination.

The fluorosurfactant is commercially available, and examples thereof include, but are not limited to, Surflon series S144 and S145 (both produced by AGC Seimi Chemical), Fluorad series FC-170C, FC-430, and FC4430 (all produced by 3M), FSO, FSO-100, FSN, FSN-100, and FS-300 (all produced by Dupont), and FT-250 and FT-251 (both produced by Neos). Such surfactants may be used individually or in combination.

The silicone surfactant may be, but is not limited to, a polysiloxane compound or a polyether-modified organosiloxane. Such surfactants may be used individually or in combination.

The silicone surfactant is commercially available, and examples thereof include, but are not limited to, BYK-306, BYK-307, BYK-333, BYK-341, BYK-345, BYK-346, BYK-347, BYK-348, and BYK-349 (all produced by BYK Additives & Instruments); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all produced by Shin-Etsu Chemical).

The surfactants cited above may be used individually or in combination. In some embodiments, acetylene glycol-based surfactants are beneficially used.

The surfactant content in the ink composition may be 0.1% to 5.0%, for example, 0.2% to 3.0% or 0.2% to 1.0%, relative to the total mass of the ink composition.

The ink composition disclosed herein may further contain other constituents as additives, for example, a pH adjuster, such as potassium hydroxide, triethanolamine, or isopropanol amine, other resin particles, a solubilizing agent, a viscosity modifier, an antioxidant, a preservative/fungicide, a fungicide, a corrosion inhibitor, and a chelating agent capable of trapping metal ions that affects dispersion, such as sodium ethylenediaminetetraacetate.

Ink Jet Printing Method

The ink jet printing method disclosed herein includes an ink application step of applying an ink composition according to an embodiment of the present disclosure onto a printing medium by ejecting the ink composition from an ink jet head. Such an ink jet printing method enables satisfactory recovery from clogging and can provide a low wet friction for the printed item while achieving high color development.

The printing medium is not particularly limited and may be absorbent or not absorbent. The ink jet printing method can be used for printing on various types of printing medium, from non-absorbent printing media into which water-soluble ink compositions cannot permeate easily to absorbent printing media into which water-soluble ink compositions penetrate easily.

The term "absorbent printing medium" used herein refers to a printing medium capable of absorbing ink compositions. The term "non-absorbent printing medium" used herein refers to a printing medium that hardly absorbs or does not absorb ink compositions. Quantitatively, the absorbent printing medium is a medium exhibiting a water absorption of more than 10 mL/m$^2$ for a period of 30 ms$^{1/2}$ from the beginning of contact with water, measured by Bristow's method. In contrast, such a water absorption of non-absorbent media is 10 mL/m$^2$ or less. Details of Bristow's method are specified in Standard No. 51 (Paper and Paperboard—Liquid Absorption Test Method—Bristow's Method (in Japanese)) of JAPAN TAPPI Paper and Pulp Test Methods edited in 2000 (in Japanese).

Absorbent printing media include, but are not limited to, plain paper such as electrophotographic paper having high ink permeability, ink jet paper having an ink absorbing layer containing silica particles or alumina particles or an ink absorbing layer made of a hydrophilic polymer such as polyvinyl alcohol (PVA) or polyvinyl pyrrolidone (PVP), and paper having relatively low ink permeability used for ordinary offset printing, such as art paper, coat paper, and cast-coated paper.

Non-absorbent printing media include, but are not limited to, plastic films or plates, such as those of polyvinyl chloride, polyethylene, polypropylene, and polyethylene terephthalate (PET); metal plates, such as those of iron, silver, copper, and aluminum, and metal-coated plates or films formed by vapor-depositing such a metal on a metal plate or plastic film; and alloy plates, such as those of stainless steel and brass.

In the ink application step, the ink composition may be ejected at an amount of 3.6 mg/inch$^2$ or more. Since the ink jet printing method uses the ink composition of an embodiment of the present disclosure, high color development can be achieved. Consequently, the printed item has a sufficient optical density in spite of such an ink ejection amount and, hence, the amount of ink composition to be used for printing can be reduced to reduce environmental load. In some embodiments, the ink ejection amount may be 6.0 mg/inch$^2$ or less, for example, 5.0 mg/inch$^2$ or less, 4.5 mg/inch$^2$ or less, or 4.0 mg/inch$^2$ or less. When the ink composition is ejected at an amount in such a range, the printed image or graphic has a sufficient optical density, whereas the amount of ink used in the ink jet printing method is reduced.

The ink jet printing method may further include a heating step of heating the printing medium to help dry the ink composition at a time before, during, or after printing operation or throughout the printing operation. The heating device used for the heating step may be, but is not limited to, a device capable of temperature control, and such heating devices include a radiation type sheathed heater, infrared radiation heater, a contact type sheet heater, and an electromagnetic wave heater. The surface temperature of the heated printing medium may be 40° C. to 80° C. The ink jet printing method may further include an air blowing step using a fan or the like.

The ink jet printing method disclosed herein may further include any other known steps that may be used in the known ink jet printing method.

EXAMPLES

The subject matter of the present disclosure will be further described in detail with reference to Examples and Comparative Examples. However, the implementation of the concept of the present disclosure is not limited to the following Examples.

Examples 1 to 9, Comparative Examples 1 to 4

Preparation of Ink Compositions 1 to 9 and 51 to 54

Preparation of Ink Compositions

Constituents were mixed in the proportions presented in Tables 1 to 3 and sufficiently stirred. Each of the ink compositions was thus prepared. More specifically, the constituents were uniformly dispersed in the mixture, followed by removing impurities through a membrane filter of 5 μm in pore size. The resulting ink compositions were evaluated as described below. The evaluation results are presented in Tables 1 to 3.

Evaluation
Color Development

Each ink composition was introduced into an ink cartridge of an ink jet printer PX-S840 (manufactured by Seiko Epson). A4 (210 mm×297 mm) sheets of copy paper "Xerox P" (manufactured by Fuji Xerox, having a basis weight of 64 g/m² and a thickness of 88 μm) were prepared as printing media. A 204 mm×291 mm solid pattern was printed on the printing medium at a print duty of 100% and an ink application amount of 4.5 mg/inch² under the conditions of 25° C. in temperature and 50% in relative humidity. After printing, the optical density (OD value) of the printed pattern was measured with a colorimeter Xrite i1 (manufactured by Xrite), and the color development was evaluated according to the criteria presented below. The ink application amount was calculated by using the following equation:

Ink application amount (mg/inch²)=(mass (mg) of the printing medium after printing−mass (mg) of the printing medium before printing)/printed area (inch²)

Criteria
A: OD value was 1.3 or more.
B: OD value was 1.2 to less than 1.3.
C: OD value was less than 1.2.

Wet Friction

The printed item prepared for the above-described color development test was fixed to a horizontal flat surface immediately after the solid pattern (204 mm×291 mm) was printed. The solid pattern side of the printed item was directly covered with an A4 (210 mm×297 mm) virgin copy paper sheet Xerox P, and onto which a weight of 50 g was loaded. The horizontal flat surface was sloped until the copy paper sheet started moving, and the angle at this time was measured for the evaluation of wet friction. It was determined that the smaller the angle, the lower the wet friction. The evaluation criteria were as follows:

Criteria
A: The angle was less than 37°.
B: The angle was less than 44°.
C: The angle was 44° or more.

Recovery from Clogging

Each ink composition was introduced into an ink cartridge of an ink jet printer PX-S840 (manufactured by Seiko Epson) and was allowed to stand in an environment of 40° C. in temperature and 20% in relative humidity with the cap removed. Then, the nozzles were subjected to cleaning several times until all the nozzles were recovered. The number of times of cleaning was counted.

A: less than 6 times of cleaning
B: 6 times to less than 9 times of cleaning
C: 9 times or more of cleaning

TABLE 1

|  |  |  | Example 1 | Example 2 | Example 3 | Example 4 | Example 5 |
|---|---|---|---|---|---|---|---|
| Ink composition No. |  |  | 1 | 2 | 3 | 4 | 5 |
| Ink composition | Pigment *1 | Aqua-Black | 7.0 | 7.0 |  | 7.0 | 7.0 |
|  |  | MA100 |  |  | 7.0 |  |  |
|  | Inorganic oxide particles *1 | SI-550 |  |  |  |  |  |
|  |  | SI-30 |  |  | 7.0 |  | 7.0 |
|  |  | SI-45P | 7.0 |  |  | 7.0 |  |
|  |  | SI-80P |  |  |  |  |  |
|  |  | ST-30L |  | 7.0 |  |  |  |
|  |  | PL-3 |  |  |  |  |  |
|  | Lactam solvent | 2-P | 5.0 | 5.0 | 5.0 |  | 5.0 |
|  |  | ε-C |  |  |  | 5.0 |  |
|  | Other solvents | Glycerin | 9.5 | 9.5 | 10.5 | 10.5 | 12.5 |
|  |  | TEGmBE | 2.0 | 2.0 | 2.0 | 2.0 | 2.0 |
|  | Surfactant | Olfine E1010 | 0.5 | 0.5 | 0.5 | 0.5 | 0.5 |
|  |  | Surfynol 104 | 0.5 | 0.5 | 0.5 | 0.5 | 0.5 |
|  | Alkali | TIPA | 0.5 | 0.5 | 0.5 | 0.5 | 0.5 |
|  | Pure water |  | Balance | Balance | Balance | Balance | Balance |
| Relationship (1) | Pigment $D_{50}$ (nm) |  | 110 | 110 | 24 | 110 | 110 |
|  | Pigment $D_{50} \times 0.1$ |  | 11 | 11 | 2.4 | 11 | 11 |
|  | Pigment $D_{50} \times 1.5$ |  | 165 | 165 | 36 | 165 | 165 |
|  | $D_{50}$ of inorganic oxide particles (nm) |  | 45 | 45 | 12 | 45 | 11 |
|  | Satisfy relationship (1)? |  | Yes | Yes | Yes | Yes | Yes |
| Results | Color development (ink application amouont: 4.5 mg/inch²) |  | A | A | B | A | B |
|  | Wet friction |  | A | A | A | A | B |
|  | Recovery from clogging |  | A | A | A | A | A |

*1: Solid content

TABLE 2

|  |  | Example 6 | Example 7 | Example 8 | Example 9 |
|---|---|---|---|---|---|
| Ink composition No. |  | 6 | 7 | 8 | 9 |
| Ink composition | Pigment *1 Aqua-Black |  | 7.0 | 7.0 | 7.0 |
|  | MA100 | 7.0 |  |  |  |
|  | Inorganic oxide particles *1 SI-550 |  |  |  |  |
|  | SI-30 |  | 7.0 |  |  |
|  | SI-45P |  |  | 5.0 | 10.0 |
|  | SI-80P |  |  |  |  |
|  | ST-30L |  |  |  |  |
|  | PL-3 | 7.0 |  |  |  |
|  | Lactam solvent 2-P | 5.0 | 2.5 | 5.0 | 5.0 |
|  | ε-C |  |  |  |  |
|  | Other solvents Glycerin | 5.5 | 22.0 | 17.5 | 19.5 |
|  | TEGmBE | 2.0 | 2.0 | 2.0 | 2.0 |
|  | Surfactant Olfine E1010 | 0.5 | 0.5 | 0.5 | 0.5 |
|  | Surfynol 104 | 0.5 | 0.5 | 0.5 | 0.5 |
|  | Alkali TIPA | 0.5 | 0.5 | 0.5 | 0.5 |
|  | Pure water | Balance | Balance | Balance | Balance |
| Relationship (1) | Pigment $D_{50}$ (nm) | 24 | 110 | 110 | 110 |
|  | Pigment $D_{50}$ × 0.1 | 2.4 | 11 | 11 | 11 |
|  | Pigment $D_{50}$ × 1.5 | 36 | 165 | 165 | 165 |
|  | $D_{50}$ of inorganic oxide particles (nm) | 35 | 11 | 45 | 45 |
|  | Satisfy relationship (1)? | Yes | Yes | Yes | Yes |
| Results | Color development (ink application amount: 4.5 mg/inch$^2$) | B | A | B | A |
|  | Wet friction | A | A | B | A |
|  | Recovery from clogging | A | B | A | B |

*1: Solid content

TABLE 3

|  |  | Comparative Example 1 | Comparative Example 2 | Comparative Example 3 | Comparative Example 4 |
|---|---|---|---|---|---|
| Ink composition No. |  | 51 | 52 | 53 | 54 |
| Ink composition | Pigment *1 Aqua-Black | 7.0 | 7.0 |  | 7.0 |
|  | MA100 |  |  | 7.0 |  |
|  | Inorganic oxide particles *1 SI-550 |  | 7.0 |  |  |
|  | SI-30 |  |  |  |  |
|  | SI-45P |  |  |  | 7.0 |
|  | SI-80P |  |  | 7.0 |  |
|  | ST-30L |  |  |  |  |
|  | PL-3 |  |  |  |  |
|  | Lactam solvent 2-P | 5.0 | 5.0 | 5.0 |  |
|  | ε-C |  |  |  | 14.5 |
|  | Other solvents Glycerin | 29.5 | 9.5 | 7.5 | 14.5 |
|  | TEGmBE | 2.0 | 2.0 | 2.0 | 2.0 |
|  | Surfactant Olfine E1010 | 0.5 | 0.5 | 0.5 | 0.5 |
|  | Surfynol 104 | 0.5 | 0.5 | 0.5 | 0.5 |
|  | Alkali TIPA | 0.5 | 0.5 | 0.5 | 0.5 |
|  | Pure water | Balance | Balance | Balance | Balance |
| Relationship (1) | Pigment $D_{50}$ (nm) | 110 | 110 | 24 | 110 |
|  | Pigment $D_{50}$ × 0.1 | 11 | 11 | 2.4 | 11 |
|  | Pigment $D_{50}$ × 1.5 | 165 | 165 | 36 | 165 |
|  | $D_{50}$ of inorganic oxide particles (nm) | — | 5 | 80 | 45 |
|  | Satisfy relationship (1)? | No | No | No | Yes |
| Results | Color development (ink application amount: 4.5 mg/inch$^2$) | C | B | C | A |
|  | Wet friction | B | C | B | A |
|  | Recovery from clogging | A | A | A | C |

*1: Solid content

The constituents used in the ink compositions are as follows:

Aqua-Black: Self-dispersible carbon black Aqua-Black 162 ($D_{50}$: 110 nm, produced by Tokai Carbon)

MA100: Carbon black MA100 ($D_{50}$: 24 nm, produced by Mitsubishi Chemical)

SI-550: Silica sol SI-550 ($D_{50}$: 5 nm, solid content: 20% by mass, produced by JGC Catalysts & Chemicals)

SI-30: Silica sol SI-30 ($D_{50}$: 12 nm, solid content: 40% by mass, produced by JGC Catalysts & Chemicals)

SI-45P: Silica sol SI-45P ($D_{50}$: 45 nm, solid content: 40% by mass, produced by JGC Catalysts & Chemicals)

SI-80P: Silica sol SI-80P ($D_{50}$: 80 nm, solid content: 20% by mass, produced by JGC Catalysts & Chemicals)

ST-30L: Silica sol ST-30L ($D_{50}$: 45 nm, solid content: 30% by mass, produced by Nissan Chemical Industries)

PL-3: Colloidal silica PL-3 ($D_{50}$: 35 nm, solid content: 20% by mass, produced by Fuso Chemical)

2-P: 2-Pyrrolidone

ε-C: ε-Caprolactam

TEGmBE: Triethylene glycol mono-n-butyl ether

Olfine E1010: Acetylene glycol-based surfactant Olfine E1010 (produced by Nissin Chemical Industry)

Surfynol 104: Acetylene glycol-based surfactant Surfynol 104 (produced by Evonik Industries)

TIPA: Tripropanolamine

Example 10

A solid pattern was printed with ink composition 1 prepared in Example 1 in the same manner as the solid pattern prepared for the color development test except for the ink application amount, and the optical density (OD value) of the printed pattern was measured with a colorimeter Xrite i1 (manufactured by Xrite). The minimum ink application amount at which the OD value came to 1.2 or more was 3.6 mg/inch².

The results of the Examples and Comparative Examples show that the ink compositions and the ink jet printing method disclosed herein produced printed items having a satisfactorily low wet friction while achieving high color development.

The comparison between Example 1 and Comparative Example 1 suggests that the ink composition disclosed herein containing inorganic oxide particles and satisfying specific conditions and the ink jet printing method disclosed herein using such an ink composition can provide high color development and a reduced wet friction.

The comparison between Example 1 and Comparative Example 2 suggests that the ink composition disclosed herein containing inorganic oxide particles and satisfying the relationship $D_{50}$ of pigment particles×0.1≤$D_{50}$ of inorganic oxide particles and the ink jet printing method disclosed herein using such an ink composition can provide high color development and a reduced wet friction.

The comparison between Example 1 and Comparative Example 3 suggests that the ink composition disclosed herein containing inorganic oxide particles and satisfying the relationship $D_{50}$ of inorganic particles≤$D_{50}$ of pigment particles×1.5 and the ink jet printing method disclosed herein using such an ink composition can provide high color development and a reduced wet friction.

The results of Examples 1 and 2 suggest that even if the inorganic oxide particles in the ink composition are varied, the ink composition and the ink jet printing method disclosed herein can provide a reduced wet friction for the printed item and enable satisfactory recovery from clogging while achieving high color development, provided that the ink composition satisfies specific conditions.

The results of Examples 1 and 3 suggest that even if the pigment is varied, the ink composition and the ink jet printing method disclosed herein can provide a reduced wet friction for the printed item while achieving high color development, provided that the ink composition satisfies specific conditions.

The results of Example 3 suggest that, even if the $D_{50}$ of the inorganic oxide particles is around the upper limit for satisfying relationship (1), the ink composition and the ink jet printing method disclosed herein can provide a reduced wet friction for the printed item and enable satisfactory recovery from clogging while achieving high color development, provided that the ink composition satisfies specific conditions.

The comparison between the results of Example 1 and Comparative Example 4 suggests that the ink composition disclosed herein containing a lactam solvent and satisfying specific conditions and the ink jet printing method disclosed herein using such an ink composition enable satisfactory recovery from clogging.

The results of Examples 1 and 4 suggest that, even if the lactam solvent is varied, the ink composition and the ink jet printing method disclosed herein can provide a reduced wet friction for the printed item and enable satisfactory recovery from clogging while achieving high color development, provided that the ink composition satisfies specific conditions.

The results of Example 5 suggest that, even if the $D_{50}$ of the inorganic oxide particles is around the lower limit for satisfying relationship (1), the ink composition and the ink jet printing method disclosed herein can provide a reduced wet friction for the printed item and enable satisfactory recovery from clogging while achieving high color development, provided that the ink composition satisfies specific conditions.

The results of Example 6 suggest that, even if the $D_{50}$ of the inorganic oxide particles is around the upper limit for satisfying relationship (1), the ink composition and the ink jet printing method disclosed herein can provide a reduced wet friction for the printed item and enable satisfactory recovery from clogging while achieving high color development, provided that the ink composition satisfies specific conditions.

The results of Example 7 suggest that the ink composition disclosed herein containing 2.5% by mass of lactam solvent and satisfying specific conditions and the ink jet printing method disclosed herein using such an ink composition can provide a reduced wet friction for the printed item and enable satisfactory recovery from clogging while achieving high color development.

The results of Examples 8 and 9 suggest that the ink composition containing 5.0% by mass to 10.0% by mass of inorganic oxide particles and satisfying specific conditions and the ink jet printing method disclosed herein using such an ink composition can provide a reduced wet friction and enable satisfactory recovery from clogging while achieving high color development.

The results of Example 10 suggest that even if the ink application amount is reduced to 3.6 mg/inch², the ink composition disclosed herein can provide a satisfactory OD value for the printed item, and that the amount of the ink composition to be used in the ink jet printing method can be reduced accordingly.

What is claimed is:

1. An aqueous ink jet ink composition comprising:
   pigment particles;
   5.0% to 10.0% of inorganic oxide particles relative to the total mass of the ink composition; and
   a lactam solvent,
   wherein the ink composition satisfies the following relationship:
   $D_{50}$ of the pigment particles×0.1≤$D_{50}$ of the inorganic oxide particles≤$D_{50}$ of the pigment particles×1.5,
   wherein $D_{50}$ represents the volume median diameter of the corresponding particles, and
   wherein the $D_{50}$ of the inorganic oxide particles is 11 nm to 100 nm.

2. The ink composition according to claim 1, wherein the inorganic oxide particles are silica particles.

3. The ink composition according to claim 1, wherein the lactam solvent is 2-pyrrolidone or ε-caprolactam.

4. An ink jet printing method comprising:
an ink application step of applying the ink composition as set forth in claim 1 onto a printing medium by ejecting the ink composition from an ink jet head.

5. The ink jet printing method according to claim 4, wherein
the ink composition is applied at an amount of 3.6 mg/inch$^2$ or more in the ink application step.

\* \* \* \* \*